United States Patent
Zhou

(10) Patent No.: US 7,384,990 B2
(45) Date of Patent: Jun. 10, 2008

(54) LATEX PARTICULATES WITH ACTIVE ESTER FUNCTIONAL GROUPS

(75) Inventor: Zhang-Lin Zhou, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 685 days.

(21) Appl. No.: 10/870,177

(22) Filed: Jun. 17, 2004

(65) Prior Publication Data

US 2005/0282927 A1 Dec. 22, 2005

(51) Int. Cl.
*C09D 11/00* (2006.01)
(52) U.S. Cl. .................. 523/160; 523/161; 523/200; 523/205; 524/548; 524/556; 524/560; 524/808; 524/831; 524/832
(58) Field of Classification Search ............... 523/160, 523/161, 200, 205; 524/548, 556, 560, 808, 524/831, 832
See application file for complete search history.

(56) References Cited

U.S. PATENT DOCUMENTS

| | | | | |
|---|---|---|---|---|
| 4,548,870 A | * | 10/1985 | Ogawa et al. | 204/616 |
| 4,549,002 A | * | 10/1985 | Hoefer et al. | 526/209 |
| 4,880,432 A | * | 11/1989 | Egan et al. | 8/647 |
| 5,086,143 A | * | 2/1992 | Sutton et al. | 526/320 |
| 5,600,462 A | * | 2/1997 | Suzuki et al. | 349/112 |
| 5,952,429 A | * | 9/1999 | Ikeda et al. | 525/326.1 |
| 6,184,268 B1 | * | 2/2001 | Nichols et al. | 523/160 |
| 6,380,318 B1 | * | 4/2002 | Saito et al. | 525/282 |
| 6,867,333 B2 | * | 3/2005 | Wessjohann et al. | 568/385 |
| 7,074,842 B2 | * | 7/2006 | Chung et al. | 523/160 |
| 2003/0232085 A1 | * | 12/2003 | Milstein et al. | 424/486 |

FOREIGN PATENT DOCUMENTS

EP 20000 A1 * 12/1980
JP 10060298 A * 3/1998

OTHER PUBLICATIONS

Machine Translation of JP 10060298 A (1998).*
Molday, Robert S., William J. Dryer, Alan Rembaum and S.P.S. Yen, "New Immunolatex Spheres: Visual Markers of Antigens on Lymphhocytes for Scanning Electron Microscopy," The Journal of Cell Biology, vol. 64, 1975, pp. 75-88.
Cousin, P. and P. Smith, "Synthesis and Characterization of Styrene-Based Microbeads Possessing Amine Functionality," Jour Appl Poly Sci, vol. 54, 1994, pp. 1631-1641.
Ganachaud, F., F. Sauzedde, A. Elaissari and C. Pichot, "Emulsifier-Free Emulsion Copolymerization of Styrene with Two Different Amino-Containing Cationic Monomers. I. Kinetic Studies," Journal of Applied Polymer Science, vol. 65, 1997, 2315-2330.
Basinska, T. and S. Slomkowski, "Attachment of Horseradish Peroxidase (HRP) onto the poly(styrene/acrolein) Latexes and onto their Derivatives with Amino Groups on the Surface; Activity of Immobilized Enzyme," Colloid Polym Sci vol. 273, 1995, 431-438.
Covolan, Vera L., Lucia H. Innocentini Mei and Claudio L. Rossi, "Chemical Modifications on Polystyrene Latex: Preparation and Characterization for Use in Immunological Applications," Polymers for Advanced Technologies, vol. 8, 1997, pp. 44-50.
Quash, G., Ann-Marie Roch, A. Niveleau, J. Grange, T. Keolouanghiiot and J. Huppert, "The Preparation of Latex Particles with Covalently Bound Polyamines, IgG and Measles Agglutinins and Their Use in Visual Agglutination Tests," Journal of Immunological Methods, 22, 1978, 165-174.

* cited by examiner

*Primary Examiner*—Bernard Lipman

(57) ABSTRACT

The present invention is drawn to compositions and methods of generating active ester functionalized latex particulates in a liquid suspension, as well as compositions and methods of preparing ink-jet inks. Steps of the methods can include synthesizing polymerizable monomers with active ester groups and polymerizing these monomers with other monomers to form functionalized latex particulates having active ester group. These latex particulates can be used in a wide variety of applications, including in ink-jet ink printing applications.

37 Claims, No Drawings

US 7,384,990 B2

LATEX PARTICULATES WITH ACTIVE ESTER FUNCTIONAL GROUPS

FIELD OF THE INVENTION

The present invention relates generally to surface functionalized latex particulates and a method for the manufacture thereof.

BACKGROUND OF THE INVENTION

Latex particles obtained by emulsion polymerization can have a variety of applications, including for use as model colloids for calibration of instruments used to measure particle size, for immobilization of biomolecules (such as proteins or peptides) on the surface of the particles, for development of new types of immunoassays, and for film formation for ink-jet printing, painting, and coating applications. A commonly used method for connecting biological molecules, dye molecules, or the like, to the surface of latex particles is by physical or passive adsorption. However, resulting colloid systems tend to be less stable. Such instability can be avoided by covalently bonding biomolecules, dye molecules, or the like, to latex particulates of an emulsion. While functionalized latex particulates have applications in these and other fields, the ink-jet ink imaging application can be used to favorably illustrate unique advantages of the invention. Specifically, there has been great improvement in the area of water durability of ink-jet inks through incorporation of certain ink-jet compatible latex polymers. When printed as part of an ink-jet ink, a latex component of the ink can form a film on a media surface, entrapping and protecting the colorant within the hydrophobic print film.

This being the case, there is a continuing need to provide improved methods of preparing latex particulates having functional groups on the surface, which can in turn be used for chemical reaction with target molecules.

SUMMARY OF THE INVENTION

It has been recognized that it would be advantageous to develop manufacturing procedures for the preparation of surface functionalized latex particulates, which can be used for ink-jet ink and other applications. In furtherance of this recognition, a latex composition can comprise an aqueous liquid having active ester functionalized latex particulates dispersed therein, wherein the latex particulates comprise copolymerized monomers. The copolymerized monomers can include active ester-containing monomers and support forming monomers.

In another embodiment, a method of generating a liquid suspension including active ester functionalized latex particulates can comprise steps of forming an emulsion including a continuous hydrophilic phase and a discontinuous hydrophobic phase, and copolymerizing the monomers to form the active ester functionalized latex particulates of the liquid suspension. The discontinuous hydrophobic phase can include a plurality of monomers, comprising active ester-containing monomers and support forming monomers.

In a related embodiment, an ink-jet ink composition can comprise a liquid vehicle, active ester functionalized latex particulates dispersed in the liquid vehicle, and a nucleophilic colorant dispersed or dissolved in the liquid vehicle. In one embodiment, at least a portion of the nucleophilic colorant can be coupled to the active ester functionalized latex particulates.

Further, a method of preparing an ink-jet ink can comprise admixing a nucleophilic colorant with a latex, wherein the latex includes a liquid phase and active ester functionalized latex particulates dispersed in the liquid phase, and interacting the nucleophilic colorant with the active ester functionalized latex particulates.

In another embodiment, a composition for sensor applications can comprise a continuous liquid phase, active ester functionalized latex particulates dispersed in the continuous liquid phase, and nucleophilic chemical or biological molecules. In one embodiment, at least a portion of the nucleophilic chemical or biological molecules are coupled to the active ester functionalized latex particulates.

In a related embodiment, a method of preparing a composition for sensor applications can comprise admixing nucleophilic chemical or biological molecules with a latex, wherein the latex includes a continuous liquid phase and active ester functionalized latex particulates dispersed in the liquid phase. An additional step of interacting the nucleophilic chemical or biological molecule with the active ester functionalized latex particulates to form chemical or biological molecule-modified latex particulates can also be carried out.

Additional features and advantages of the invention will be apparent from the detailed description that follows which illustrates, by way of example, features of the invention.

DETAILED DESCRIPTION OF THE PREFERRED EMBODIMENT(S)

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

Likewise, the use of plural referents does not necessarily imply the use of multiple compositions. For example, referring to monomers in the plural form does not necessarily mean that multiple monomer types are present, but that multiple actual monomer molecules of at least one type are present. Such a reference does not, however, preclude the presence of other monomer types.

The term "protected" refers to the state of a functional group that is capped with or bonded to a moiety that allows an active ester bond to undergo emulsion polymerization processes, but also, can be reactive with nucleophilic groups. Stated another way, the ester bond is of a type that is termed "active" in that it is stable enough for the emulsion polymerization process, but can be modified in the presence of a nucleophile.

Thus, the term "active ester" refers to ester groups that are present and can remain substantially intact during the process of emulsion polymerization, but which have a constituent that can be removed or otherwise react in order to become coupled to a molecule having a nucleophilic group. Typically, active esters do not substantially participate in the polymerization process of per se, but can be present on polymerizable monomers which are used to form latex particulates.

The term "active ester-containing monomers" are monomers that include active ester groups, and which can be copolymerized with other monomers to form latex particulates in accordance with embodiments of the present invention.

"Support forming monomers" refers to one or more monomer type that can be copolymerized with active ester-containing monomers to form the active ester-containing latex particulates in accordance with embodiments of the present invention. Support forming monomers can provide bulk properties to monomers, can be film forming monomers, or can provide other desirable properties, depending on the application for which the latex particulates are prepared. For example, in ink-jet applications, it may be desirable to select support forming monomers (for copolymerization with active ester-containing monomers) that have properties that promote the formation of films once the latex is printed on a media substrate. Alternatively, if it is desirable to form latex particulates for biological or chemical sensor applications, it may be desirable to maintain the bulk properties of the latex.

The term "nucleophile" or "nucleophilic" refers to compositions, such as biological or chemical sensor compositions, dyes, additives, or other molecules that have a group that is attracted to nuclei and tends to donate or share electrons.

"Colorant" can include dyes, pigments, and/or other particulates that may be suspended or solvated in a liquid vehicle in accordance with embodiments of the present invention. Dyes are typically water soluble, and therefore, can be desirable for use in many embodiments. However, pigments can also be used. Pigments that can be used include self-dispersed pigments and polymer dispersed pigments. Self-dispersed pigments include those that have been chemically surface modified with a charge or a polymeric grouping. This chemical modification aids the pigment in becoming and/or substantially remaining dispersed in a liquid vehicle. The pigment can also be a polymer-dispersed pigment that utilizes a dispersant (which can be a polymer or an oligomer or a surfactant) in the liquid vehicle and/or in the pigment that utilizes a physical coating to aid the pigment in becoming and/or substantially remaining dispersed in a liquid vehicle.

The term "about" when referring to a numerical value or range is intended to encompass the values resulting from experimental error that can occur when taking measurements.

As used herein, "liquid vehicle" is defined to include liquid compositions that can be used to carry colorants to a substrate. Liquid vehicles are well known in the art, and a wide variety of ink vehicles may be used in accordance with embodiments of the present invention. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as latex particulates and other polymers, UV curable materials, plasticizers, and/or cosolvents in some embodiments. The terms "liquid phase" and "aqueous liquid" can also be used to describe a liquids used to carry the latex particulates of the present invention. Liquid phase, liquid vehicle, and aqueous liquid can be used interchangeably; however, the terms liquid phase or aqueous liquid are generally used when discussing embodiments that are other than ink-jet ink embodiments, e.g., prior to inclusion of nucleophilic colorant, biological or chemical sensor embodiments, etc.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described.

With this in mind, it has been recognized that it would be advantageous to develop a practical method for the preparation of latex polymer particulates having reactive functional groups on the surface. Specifically, these reactive functional groups are active esters that can be reacted with nucleophile-containing molecules, as are often present on dyes and other molecules. Examples of such nuceophilic groups include $—NH_2$, $—RNH$, $—SH$, $—OH$, etc. Examples of molecules other than dyes that can include nucleophilic groups, and which can react with the active esters of the latex particulates include biological molecules such as those used as bio-sensors or bio-detection, chemical sensors, or the like. In other words, the active ester groups can be used to attach dye molecules, biological molecules, or other useful molecules, to the latex particulate surface.

In one embodiment, a latex composition can comprise an aqueous liquid having active ester functionalized latex particulates dispersed therein, wherein the latex particulates comprise copolymerized monomers. The copolymerized monomers can include active ester-containing monomers and support forming monomers, which can be film forming monomers and/or other monomers that provide bulk or other properties.

In another embodiment, a method of generating a liquid suspension including active ester functionalized latex particulates can comprise steps of forming an emulsion including a continuous hydrophilic phase and a discontinuous hydrophobic phase, and copolymerizing the monomers to form the active ester functionalized latex particulates of the liquid suspension. The discontinuous hydrophobic phase can include a plurality of monomers, comprising active ester-containing monomers and support forming monomers, which can be film forming monomers and/or other monomers that provide bulk or other properties.

In still another embodiment, an ink-jet ink composition can comprise a liquid vehicle, active ester functionalized latex particulates dispersed in the liquid vehicle, and a nucleophilic colorant dispersed or dissolved in the liquid vehicle. In one embodiment, at least a portion of the nucleophilic colorant can be coupled to the active ester functionalized latex particulates.

In another embodiment, a method of preparing an ink-jet ink can comprise admixing a nucleophilic colorant with a latex, wherein the latex includes a liquid phase and active ester functionalized latex particulates dispersed in the liquid phase, and interacting the nucleophilic colorant with the active ester functionalized latex particulates.

In another embodiment, a composition for sensor applications can comprise a continuous liquid phase, active ester functionalized latex particulates dispersed in the continuous liquid phase, and nucleophilic chemical or biological molecules. In one embodiment, at least a portion of the nucleophilic chemical or biological molecules are coupled to the active ester functionalized latex particulates.

In a related embodiment, a method of preparing a composition for sensor applications can comprise admixing nucleophilic chemical or biological molecules with a latex, wherein the latex includes a continuous liquid phase and active ester functionalized latex particulates dispersed in the liquid phase. An additional step of interacting the nucleophilic chemical or biological molecule with the active ester functionalized latex particulates to form chemical or biological molecule-modified latex particulates can also be carried out.

To provide an example of an embodiment of the present invention, one can consider the preparation of active ester functionalized latex particulates. In this embodiment, an active ester-containing monomer can be prepared and copolymerized with acrylic acid or another acrylate in an emulsion polymerization process. After polymerization, if it is desired to attach a dye or other molecule to the latex particulates, one can select such molecules that include a nucleophilic moiety. As this method of preparing active ester latex particulate does not add any chemicals to the emulsion system, the latex emulsion can typically remain stable.

Formula 1a provides a schematic representation of an embodiment of the present invention, wherein the preparation of an active ester monomer is shown, as follows:

Formula 1a

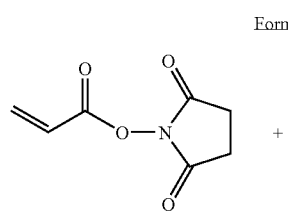

Formula 1 b below provides a schematic representation of the copolymerization of acrylic acid or other acrylate with the monomer prepared in Formula 1a, as follows:

Formula 1b

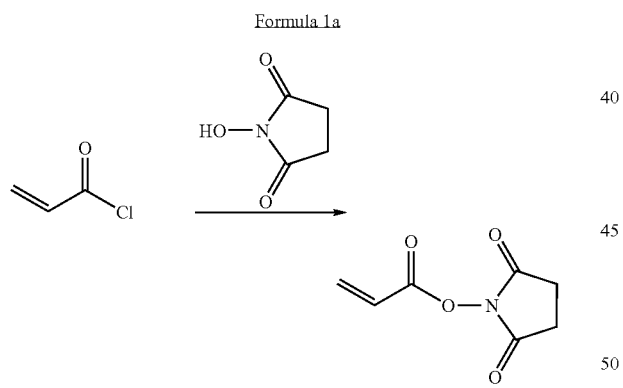

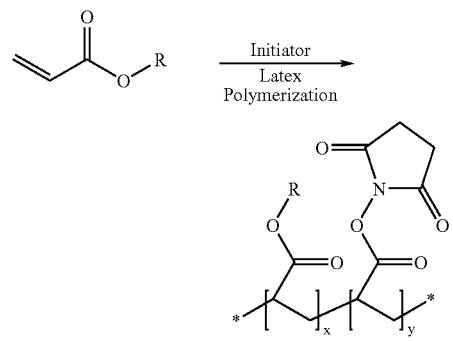

In Formula 1b above, x can be from about 10 to about 25,000; y can be from about 1 to about 2,500; and each R can independently be $C_1$-$C_8$ alkyl, aryl, substituted aryl, or H, for example. Typically the active ester-containing monomer(s) can be present at from 0.01 wt % to 10% by monomers.

Formula 2a below provides a schematic representation of another embodiment of the present invention, wherein the preparation of an active ester monomer is shown, as follows:

Formula 2a

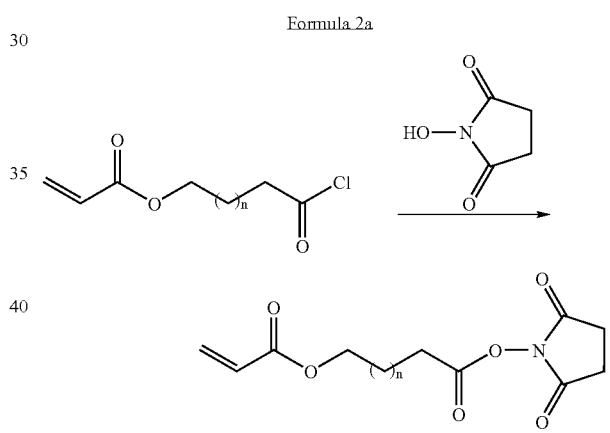

Formula 2b below provides a schematic representation of the copolymerization of acrylic acid or other acrylate with the monomer prepared in Formula 2a, as follows:

Formula 2b

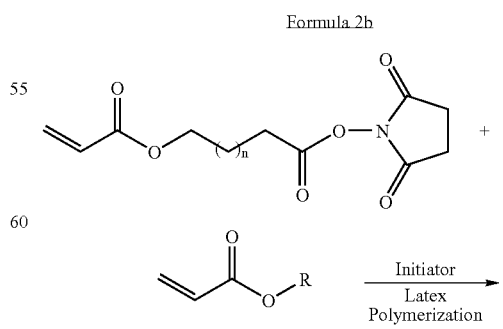

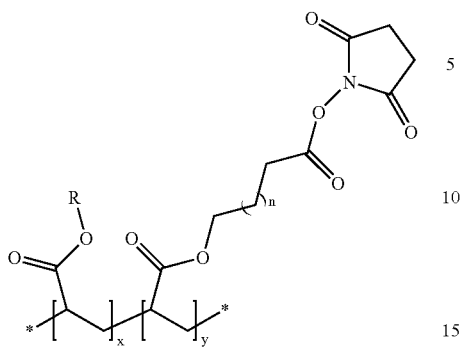

In Formula 2b above, x can be from about 10 to about 25,000; y can be from about 1 to about 2,500; each R can individually be $C_1$-$C_8$ alkyl, aryl, substituted aryl, or H; and n can be from 0 to 3, for example. Again, typically the active ester-containing monomer(s) can be present at from 0.01 to 10% by monomers.

Formula 3a below provides a schematic representation of another embodiment of the present invention, wherein the preparation of an active ester monomer is shown, as follows:

Formula 3a

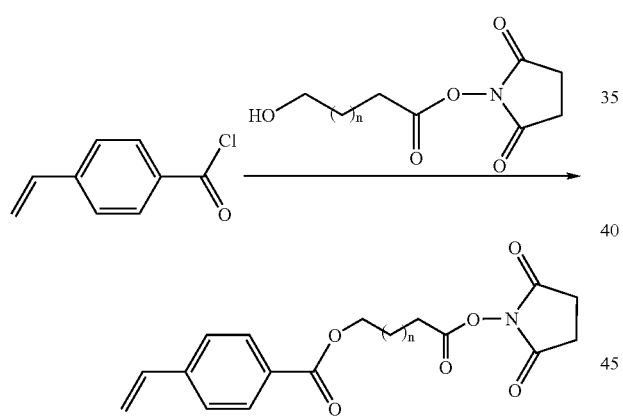

Formula 3b below provides a schematic representation of the copolymerization of acrylic acid or other acrylate with the monomer prepared in Formula 3a, as follows:

Formula 3b

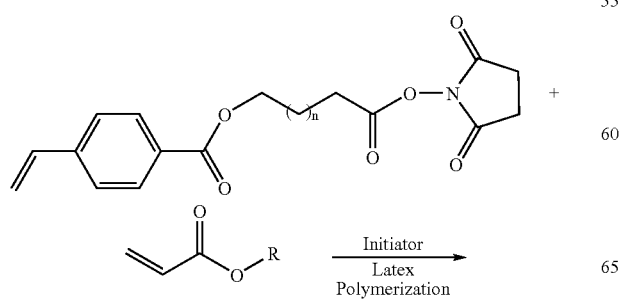

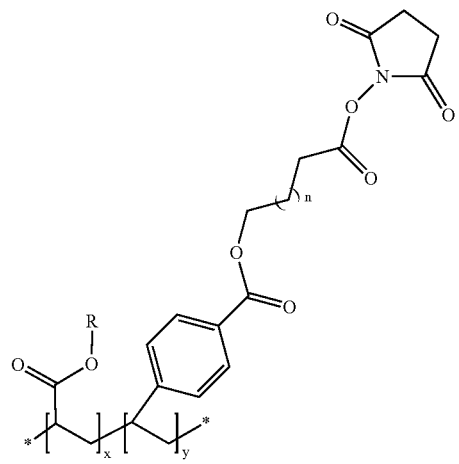

In Formula 3b above, x can be from about 10 to about 25,000; y can be from about 1 to about 2,500; R can be $C_1$-$C_8$ alkyl, aryl, substituted aryl, or H; and n can be from 0 to 3, for example. Again, typically the active ester-containing monomer(s) can be present at from 0.01 to 10% by monomers.

Formula 4a below provides a schematic representation of another embodiment of the present invention, wherein the preparation of an active ester monomer is shown, as follows:

Formula 4a

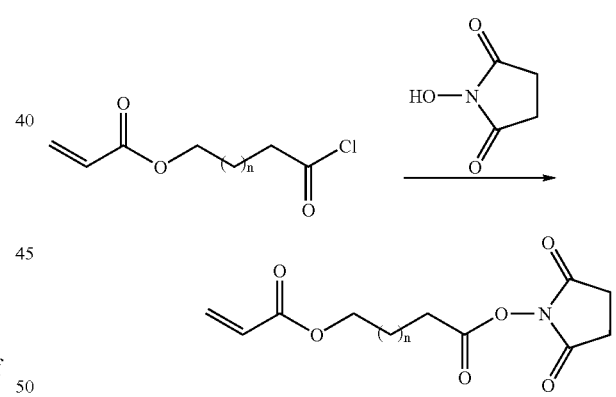

Formula 4b below provides a schematic representation of the copolymerization of acrylic acid or other acrylate, methacrylic acid or other methacrylate, and the monomer prepared in Formula 4a, as follows:

Formula 4b

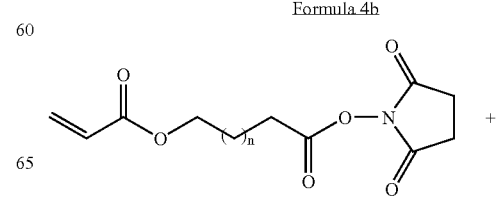

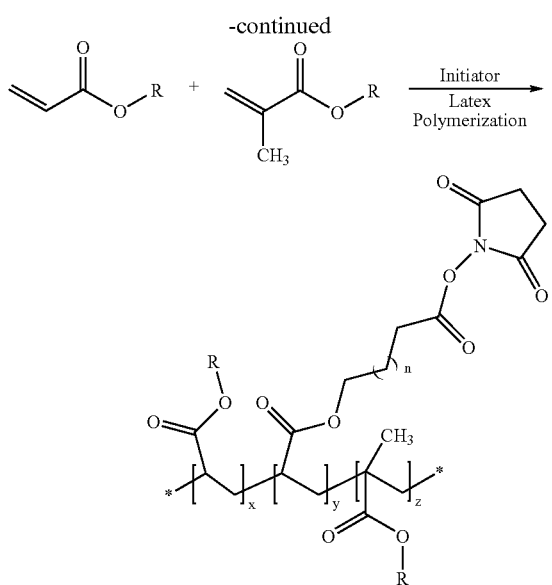

In Formula 4b above, x can be from about 10 to about 25,000; y can be from about 1 to about 2,500; each R can individually be $C_1$-$C_8$ alkyl, aryl, substituted aryl, or H; and n can be from 0 to 3, for example. Again, typically the active ester-containing monomer(s) can be present at from 0.01 to 10% by monomers.

In each of the above Formulas, particularly in the ink-jet ink arts, the acrylic acid or acrylate monomers and/or methacrylic acid or methacrylate monomers, can be included to provide film forming properties of the latex particulates. In other words, these monomers of the latex particulates can act to form a film upon printing the ink on a media substrate. Such film forming properties can contribute to image permanence. However, it is to be noted that other monomers can be used which also have film forming properties, or which have other desirable properties, e.g., bulk properties.

The active ester-containing monomer(s) can provide a means for reacting nucleophile-containing molecules, such as nucleophile-containing dyes, chemical sensor molecules, biological sensor molecules, etc., with the latex particulates in accordance with embodiments of the present invention. Examples of nucleophile-containing molecules that can be attached to the active ester-containing latex particulates of the present invention include dyes and other molecules that have nucleophilic groups, such as amino group(s), substituted amino group(s), hydroxy group(s), thiol group(s), and the like.

The preparation of latex particulates in accordance with some embodiments of the present invention can result in a latex emulsion having latex particulates of a weight average molecular weight from 10,000 Mw to 5,000,000 Mw. This range is only exemplary and can be broader, as indicated by the number of monomers described in the Formulas 1a to 4b above. Additionally, the formulations shown above are exemplary only, depicting only specific copolymers. Other copolymers can be prepared in accordance with embodiments of the present invention. For example, other monomers can be used (both active ester monomers not specifically shown as well as film-forming monomers not specifically shown). Further, various types of polymers can be formed, including block copolymers, randomly assembled copolymers, copolymers including crosslinkers, or the like. Still further, monomers with other types of functional groups can be copolymerized with other monomers with or without functional groups at various ratios to provide various results. If a crosslinking agent is used to crosslink a polymer, the application of use of the resultant latex particulate can be considered. For example, if the latex particulate is to be used in an ink-jet printing system, then from 0.1 wt % to 10 wt % of the crosslinking agent can be present with the monomers and copolymerized therewith.

It should be noted that the preparation of a latex, which includes the latex particulates and a liquid phase, and the preparation of an ink-jet ink that includes a latex, can be carried out in many different ways. In one embodiment, the liquid phase of the latex and the liquid vehicle can become admixed to form a modified liquid vehicle containing the latex particulates and the colorant. If the colorant is a dye, then the dye is typically solvated in the liquid vehicle. In this embodiment, the total amount of solids in the ink-jet ink will be due to the presence of latex particulates prepared in accordance with embodiments of the present invention. In one embodiment, the dye can include a nucelophilic group that is reactive with the active ester, thus providing dye-modified latex particulates in the ink-jet ink. Alternatively, the colorant can be a pigment. If the pigment is a self-dispersed or polymer-dispersed pigment, the total solids content of the latex particulates and pigments should be considered when determining relative amounts that should be present for jettability purposes, as is known in the art. If utilizing a colorant to form an ink-jet ink, the method can further comprising the step of reacting the colorant with the functionalized latex particulates to form colorant-bound latex particulates.

Alternatively, if no colorant is used, but rather, the latex is admixed with a liquid vehicle to form an ink-jettable colorless solution or dispersion, then an ink-jettable protective coating material can be formed. In this embodiment, typically, an ink-jet ink can be jetted onto a substrate to produce an image, and the ink-jettable colorless solution can be overprinted with respect to the printed image for protection. If the ink-jet ink includes a nucleophilic dye, the colorless solution or dispersion can react with the dye at the interface between the ink-jet ink and the colorless solution or dispersion layer, or upon liquid mixing on the print medium. In other words, the latex particulates can form a film over the printed image, and as the latex particulates are functionalized with active ester groups, the functional surfaces of the latex particulates can interact with the colorant or other component of the printed ink-jet ink to provide additional protection to the image.

A typical liquid vehicle formulation that can be used with the latexes described herein can include water, and optionally, one or more co-solvents present in total at from 0.1 wt % to 30 wt %, depending on the ink-jet architecture and/or other considerations known in the art. Optionally, one or more non-ionic, cationic, and/or anionic surfactants can be present, ranging from 0.1 wt % to 5.0 wt %. The balance of the formulation can be purified water, or other vehicle components known in the art, such as biocides, viscosity modifiers, materials for pH adjustment, sequestering agents, preservatives, and the like. Typically, the liquid vehicle is predominantly water.

Classes of co-solvents that can be used include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2- alcohols, 1,3-alcohols, 1,5-alcohols, ethylene glycol alkyl ethers, propylene glycol alkyl ethers, higher homologs of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this invention may range from 0 wt % to 5.0 wt %.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2.0 wt %, for example, can be used. Viscosity modifiers and buffers may also be present, as well as other additives known to those skilled in the art to modify properties of the ink as desired. Such additives can be present at from 0 wt % to 20.0 wt %.

EXAMPLES

The following examples illustrate embodiments of the invention that are presently known. Thus, these examples should not be considered as limitations of the present invention, but are merely in place to teach how to make the best-known compositions of the present invention based upon current experimental data. As such, a representative number of compositions and their method of manufacture are disclosed herein.

Example 1

Preparation of Active Ester Functionalized Polymerizable Monomers

N-Hydroxysuccinimide was reacted with methacryloyl chloride at a 1:1 molar ratio in the presence of triethylamine in dichloromethane to obtain a methacryloyloxy succinimidyl ester. This method resulted in the production of a polymerizable monomer having an active ester group.

Example 2

Preparation of Active Ester Functionalized Latex Particulates

The polymerizable monomer containing the active ester group (10 wt %) of Example 1 was mixed with methyl methacrylate (42 wt %), hexyl acrylate (42 wt %), and methacrylic acid (6 wt %) to form a monomer mixture. Though a cross-linker was not used in this example, it is to be noted that a cross-linker can be used, e.g., ethylene glycol dimethacrylate (0.5 to 10 wt %). The monomer mixture (about 35 wt %) was emulsified with Rhodafac RS 710 surfactant (2.5 wt % with respect to the monomers) and a balance of water. The monomer emulsion was added drop wise to hot water containing a potassium persulfate water soluble initiator (about 0.4 wt % with respect to the monomers). The heating was continued for a period of two hours and then cooled to ambient temperature. The latex was neutralized with potassium hydroxide solution to obtain latex particulates having active ester groups. The particulates were present in a latex dispersion or emulsion.

Example 3

Ink-Jet Ink Preparation

The latex emulsion prepared in accordance with Example 2 (equivalent to 2.5 g solid polymer) was mixed with a nucleophilic dye along with a liquid vehicle (20 g). The liquid vehicle included water, 2-pyrrolidone and ethylene glycol. The concentration of the dye was about 3 wt %. As the dye included a nucleophilic group, the dye molecule reacted with the active ester of the latex particulates, thereby coupling at least a portion of the dye molecules to the latex particulates.

While the invention has been described with reference to certain preferred embodiments, those skilled in the art will appreciate that various modifications, changes, omissions, and substitutions can be made without departing from the spirit of the invention. It is intended, therefore, that the invention be limited only by the scope of the following claims.

What is claimed is:

1. A latex composition, comprising an aqueous liquid having active ester functionalized latex particulates dispersed therein, said latex particulates comprising copolymerized monomers, said monomers including:
   a) active ester-containing acrylate monomers; and
   b) support forming monomers,
   wherein the active ester functionalized latex particulates have an average weight average molecular weight from about 10,000 Mw to 5,000,000 Mw.

2. A latex composition as in claim 1, wherein the support forming monomers are film forming monomers selected from the group consisting of acrylic acid, methacrylic acid, acrylates, methacrylates, and combinations thereof.

3. A latex composition as in claim 2, wherein the film forming monomers are acrylic acid or acrylates of the formula:

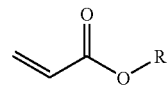

where R is $C_1$-$C_8$ alkyl, aryl, substituted aryl, or H.

4. A latex composition as in claim 1, wherein the active ester-containing acrylate monomers are a reaction product of a carboxyl acid halogen and a succinimide.

5. A latex composition as in claim 4, wherein the carboxyl acid halogen is selected from the group consisting of acryloyl chloride, an acrylate acid chloride, and an aromatic carboxyl acid chloride.

6. A latex composition as in claim 4, wherein the succinimide is selected from the group consisting of N-hydroxysuccinimide and 4-vinylbenzoic acid chloride.

7. A latex composition as in claim 1, wherein the molar ratio of active ester-containing monomers to support forming monomers is from 1:1000 to 1:10.

8. A latex composition as in claim 1, wherein the support forming monomers are present as multiple monomer types.

9. A method of generating a liquid suspension including active ester functionalized latex particulates, comprising steps of:
   a) forming an emulsion including a continuous hydrophilic phase and a discontinuous hydrophobic phase, said discontinuous hydrophobic phase including a plurality of monomers, said monomers comprising:
      i) active ester-containing acrylate monomers, and
      ii) support forming monomers; and
   b) copolymerizing the monomers to form the active ester functionalized latex particulates of the liquid suspension,
   wherein the active ester functionalized latex particulates have an average weight average molecular weight from about 10,000 Mw to 5,000,000 Mw.

10. A method as in claim 9, wherein the support forming monomers are film forming monomers selected from the group consisting of acrylic acid, methacrylic acid, acrylates, methacrylates, and combinations thereof.

11. A method as in claim 10, wherein the film forming monomers are acrylic acid or an acrylate of the formula:

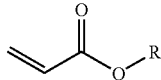

where R is $C_1$-$C_8$ alkyl, aryl, substituted aryl, or H.

12. A method as in claim 9, wherein the active ester-containing acrylate monomers are a reaction product of a carboxyl acid halogen and a succinimide.

13. A method as in claim 12, wherein the carboxyl acid halogen is selected from the group consisting of acryloyl chloride, an acrylate acid chloride, and an aromatic carboxyl acid chloride.

14. A method as in claim 12, wherein the succinimide is selected from the group consisting of N-hydroxysuccinimide and 4-vinylbenzoic acid chloride.

15. A method as in claim 9, wherein the molar ratio of active ester-containing monomers to support forming monomers is from 1:1000 to 1:10.

16. A method as in claim 9, wherein the support forming monomers are present as multiple monomer types.

17. An ink-jet ink composition, comprising:
   a) a liquid vehicle;
   b) active ester functionalized latex particulates dispersed in the liquid vehicle; and
   c) a nucleophilic colorant dispersed or dissolved in the liquid vehicle, wherein at least a portion of the nucleophilic colorant is coupled to the active ester functionalized latex particulates,
   wherein the active ester functionalized latex particulates have an average weight average molecular weight from about 10,000 Mw to 5,000,000 Mw.

18. An ink-jet ink as in claim 17, wherein the active ester functionalized latex particulates are the product of copolymerized monomers, said monomers including:
   a) active ester-containing monomers; and
   b) film forming monomers.

19. An ink-jet ink as in claim 18, wherein the film forming monomers are selected from the group consisting of acrylic acid, methacrylic acid, acrylates, methacrylates, and combinations thereof.

20. An ink-jet ink as in claim 18, wherein the active ester-containing monomers are active ester-containing acrylate monomers.

21. An ink-jet ink as in claim 20, wherein the active ester-containing acrylate monomers are a reaction product of a carboxyl acid halogen and a succinimide.

22. An ink-jet ink as in claim 18, wherein the molar ratio of active ester-containing monomers to film forming monomers is from 1:1000 to 1:10.

23. An ink-jet ink as in claim 18, further comprising a third monomer copolymerized with the active ester-containing monomers and the film forming monomers.

24. An ink-jet ink as in claim 17, wherein the nucleophilic colorant is a dye having a nucleophilic reactive group selected from the group consisting of amino, secondary amine, thiol, and hydroxyl.

25. An ink-jet ink as in claim 17, wherein the nucleophilic colorant is a pigment having a nucleophilic reactive group selected from the group consisting of amino, secondary amine, thiol, and hydroxyl.

26. A method of preparing an ink-jet ink, comprising:
   a) admixing a nucleophilic colorant with a latex, said latex including a liquid phase and active ester functionalized latex particulates dispersed in the liquid phase; and
   b) interacting the nucleophilic colorant with the active ester functionalized latex particulates to form colorant-modified latex particulates,
   wherein the active ester functionalized latex particulates have an average weight average molecular weight from about 10,000 Mw to 5,000,000 Mw.

27. A method as in claim 26, wherein the admixing step includes admixing the latex with a pre-formed ink-jet ink, said preformed ink-jet ink including a liquid vehicle and the colorant.

28. A method as in claim 27, wherein the latex is admixed with the liquid vehicle, wherein the liquid phase of the latex becomes part of the liquid vehicle.

29. A method as in claim 26, wherein the latex is prepared by emulsion copolymerization of a plurality of monomers to form the active ester functionalized latex particulates, said monomers including active ester-containing monomers, and film forming monomers.

30. A method as in claim 29, wherein the film forming monomers are selected from the group consisting of acrylic acid, methacrylic acid, acrylates, methacrylates, and combinations thereof.

31. A method as in claim 29, wherein the active ester-containing monomers are active ester-containing acrylate monomers.

32. A method as in claim 31, wherein the active ester-containing acrylate monomers are a reaction product of a carboxyl acid halogen and a succinimide.

33. A method as in claim 29, wherein the molar ratio of active ester-containing monomers to film forming monomers is from 1:1000 to 1:10.

34. A method as in claim 26, wherein the nucleophilic colorant is a dye having a nucleophilic reactive group selected from the group consisting of amino, secondary amine, thiol, and hydroxyl.

35. A method as in claim 26, wherein the nucleophilic colorant is a pigment having a nucleophilic reactive group selected from the group consisting of amino, secondary amine, thiol, and hydroxyl.

36. A composition for sensor applications, comprising:
   a) a continuous liquid phase;
   b) active ester functionalized latex particulates dispersed in the continuous liquid phase, where said active ester functionalized latex particulates are the product of copolymerized monomers, said monomers including:
      i) active ester-containing monomers, and
      ii) support forming monomers;
   wherein the active ester-containing monomers are a reaction product of a carboxyl acid halogen and a succinimide; and
   c) nucleophilic chemical or biological sensing molecules, wherein at least a portion of the nucleophilic chemical or biological sensing molecules are coupled to the active ester functionalized latex particulates.

37. A method of preparing a composition for sensor applications, comprising:
   a) admixing nucleophilic chemical or biological molecules with a latex, said latex including a continuous liquid phase and active ester functionalized latex particulates dispersed in the liquid phase; and
   b) interacting the nucleophilic chemical or biological molecule with the active ester functionalized latex particulates to form chemical or biological sensing molecule-modified latex particulates;
   wherein the latex is prepared by emulsion copolymerization of a plurality of monomers to form the active ester functionalized latex particulates, said monomers including active ester-containing monomers and support forming monomers, and wherein said active ester-containing monomers are a reaction product of a carboxyl acid halogen and a succinimide.

* * * * *